United States Patent [19]
Takahashi

[11] Patent Number: 6,100,480
[45] Date of Patent: Aug. 8, 2000

[54] ROTATIVELY-OPERATED ELECTRIC COMPONENT AND COORDINATE INPUT DEVICE USING THE ROTATIVELY-OPERATED ELECTRIC COMPONENT

[75] Inventor: Kisaburo Takahashi, Miyagi-ken, Japan

[73] Assignee: Alps Electric Co., Ltd., Japan

[21] Appl. No.: 09/041,242

[22] Filed: Mar. 12, 1998

[30] Foreign Application Priority Data

Mar. 13, 1997 [JP] Japan .................................. 9-059686
Jun. 9, 1997 [JP] Japan .................................. 9-150585

[51] Int. Cl.$^7$ .................................................. H01H 25/00
[52] U.S. Cl. ........................... 200/330; 200/4; 200/11 R
[58] Field of Search .............................. 200/1 R, 4, 5 R,
200/6 R, 7, 11 R, 14, 11 A, 11 D, 11 DA,
11 TC, 11 TW, 16 R, 17 R, 18, 564, 566,
570, 572, 330, 336

[56] References Cited

U.S. PATENT DOCUMENTS

| | | | |
|---|---|---|---|
| 3,571,534 | 3/1971 | Ashman | 200/11 |
| 4,866,219 | 9/1989 | Riding et al. | 200/4 |
| 5,180,050 | 1/1993 | Rada et al. | 200/329 |
| 5,448,240 | 9/1995 | Morito | 200/564 |
| 5,593,023 | 1/1997 | Kaizaki et al. | 200/570 |
| 5,596,779 | 1/1997 | Meek | 5/600 |
| 5,613,600 | 3/1997 | Yokoji et al. | 341/176 |
| 5,705,778 | 1/1998 | Matsui et al. | 200/11 R |
| 5,711,415 | 1/1998 | Fukuda et al. | 200/570 |

*Primary Examiner*—Michael Friedhofer
*Attorney, Agent, or Firm*—Brinks Hofer Gilson & Lione

[57] ABSTRACT

In a rotatively-operated electric component, there is provided an Oldham's coupling between the rotary member for operating the electric component member and the operation body. The operation body is disposed with the axis of rotation thereof deviated from the axis of rotation of the rotary member so that the operation body is held by the bearing member and so that the push switch is operated by the driving member integral with the bearing member.

12 Claims, 12 Drawing Sheets

ROTATIVELY-OPERATED ELECTRIC COMPONENT AND COORDINATE INPUT DEVICE USING THE ROTATIVELY-OPERATED ELECTRIC COMPONENT

BACKGROUND OF THE INVENTION

The present invention relates to a rotatively-operated electric component and a coordinate input device using this rotatively-operated electric component.

A description will be made of a conventional rotatively-operated electric component and a coordinate input device using this rotatively-operated electric component.

A conventional rotary electric component is constructed such that as shown in FIGS. 15 to 19, rotation of a rotary shaft K operates a rotary component R, and movement of the rotary shaft K in a direction perpendicular to its axial direction operates a push switch P.

The rotary component R is constructed such that a contact member 100 having a pair of sliding contact arms 100a and 100b is fixed to a box-shaped case 101, and that a rotary member 103 to which a contact plate 102 for slidably contacting the sliding contact arm 100a is fixed and a cover 104 are rotatably mounted to the rotary shaft K within this box-shaped case 101.

The push switch P is disposed on the side of the side surface of the rotary component R, and is constructed such that a contact portion (not shown) is provided within a housing 105, and there is provided an operation button 106 which is movably mounted to the housing 105.

As shown in FIG. 18, a flat plate-shaped insulating substrate 108 is provided with a recess 108a for guiding the rotary component R, a pair of rails 108b located on both sides of this recess 108a, for preventing the rotary component R from coming off, a recess 108c which is spaced apart from the recess 108a, and a projection 108d.

Further, on the insulating substrate 108, fixed contacts 109 are embedded in the recess 108a in an exposed state.

A case 101 for the rotary component R is placed on the recess 108a on the insulating substrate 108, and the rotary component R is mounted onto the insulating substrate 108 in such a manner that the rails 108b abut on stage portions 101a of the case 101 and the case 101 is resiliently depressed by a torsion coil spring 110 engaged with the projection 108d.

When the rotary component R has been mounted, the sliding contact arm 100b is in contact with a contact 109a exposed on the insulating substrate 108.

A housing 105 for the push switch P is fitted in the recess 108c on the insulating substrate 108, and the push switch P is mounted on the insulating substrate 108 so that the operation button 106 faces to a protrusion 101b of the case 101 for the rotary component R.

To describe the operation of the conventional rotatively-operated electric component, first when the rotary shaft K is rotated, this rotation causes the rotary member 103 to rotate on an axis G of rotation of the rotary shaft K.

Then, a contact plate 102 mounted to the rotary member 103 also rotates and moves into and out of touch with the sliding contact arm 100a to switch the contact, and this switching of the contact is transmitted to the fixed contact 109 through the sliding contact arm 100b and the contact 109a.

On depressing the rotary shaft K in a direction perpendicular to the axis G of rotation thereof, that is, in a direction indicated by an arrow Y, the rotary shaft K moves in the direction indicated by an arrow Y together with the rotary component R against a torsion coil spring 110.

At this time, the sliding contact arm 100b slides on the contact 109a of the fixed contact 109 so that a protrusion 101b of the case 101 presses an operation button 106 of the push switch P while the electrical connection of the rotary component R is maintained.

Then, the contact of the push switch P is switched, and thereafter, when the depressing force on the rotary shaft K is removed, the rotary component R moves to a before-depressing state together with the rotary shaft K by the force of the torsion coil spring 110.

At this time, the sliding contact arm 100b slides on the contact 109a to maintain the electrical connection of the rotary component R, and to return the operation button 106 to the before-depressing state, thus switching the contact of the push switch P.

By rotation of the rotary shaft K in this way, the rotary component R is operated, and the rotary shaft K is caused to move in a direction perpendicular to the axis G of rotation to thereby operate the push switch P.

In the case of applying such a rotatively-operated electric component to a coordinate input device such as, for example, a mouse for use with computer, as shown in FIG. 19, a rotatively-operated electric component is accommodated and mounted within a case 111 for a coordinate input device, and an operation knob 112 is mounted to the rotary shaft K of the rotatively-operated electric component such that this operation knob 112 is caused to protrude outwardly from an opening 111a in the case 111 so as to operate this operation knob 112.

By the operation of such a coordinate input device, a menu is displayed on a display by means of, for example, a member not shown.

Next, a desired menu is decided by depressing the operation knob 112 to operate the push switch P, and thereafter by rotating the operation knob 112 to operate the rotary component R, items and the like listed on the menu are displayed.

The conventional rotatively-operated electric component has a problem that it becomes large-sized because the rotary component R moves when the rotary shaft K is caused to move in a direction perpendicular to the axis G of rotation thereof.

Also, in order to maintain the electrical connection of the rotary component R during the movement of the rotary component R. structure is required in which the sliding contact arm 100b is caused to slidably contact with the fixed contact 109. For this reason, there is a problem that it is difficult to extend the life, and its structure is complicated to increase the cost.

Also, since the rotary component R is operated by the rotary shaft K, the rotary shaft K is always located at one place, and there is a problem that the operating position is not flexible, but there is no degree of freedom for arrangement.

Also, since the push switch P is disposed on the side of the side surface of the rotary component R, the rotatively-operated electric component becomes large-sized.

Also, in the conventional input device, as can be seen from FIG. 19, a radius of the operation knob 112 requires a length L3 between the axis G of rotation of the rotary shaft K and the outer surface of the rotary component R and a length L4 required for projecting the operation knob 112 outwardly. Therefore, there is a problem that the device and the operation knob 112 does not only become large-sized, but also there is no degree of freedom in the layout of the rotatively-operated electric component.

SUMMARY OF THE INVENTION

As first means for solving the above-described problems, the rotatively-operated electric component comprises: an operation body movable in a direction perpendicular to an axial direction and rotatable; an electric component member for outputting an electric signal by a rotating operation; a first push switch; and an Oldham's coupling provided between the operation body and a rotary member for operating the electric component member, in such a manner that the rotary member is rotated through the Oldham's coupling by rotation of the operation body to operate the electric component member, and that the first push switch is operated when the operation body moves in a direction perpendicular to the axial direction of the rotary member.

As second solution means, the rotatively-operated electrical component comprises: a rotary member rotatably supported; an electric component member for outputting an electric signal by rotating operation of the rotary member; an operation body rotatably mounted to a bearing member; and an Oldham's coupling disposed between the operation body and the rotary member, in such a manner that the operation body is disposed with the axis of rotation of the operation body deviated from the axis of rotation of the rotary member, and that the rotary member is rotated through the Oldham's coupling by rotating operation of the operation body.

As third solution means, the rotatively-operated electrical component is constructed such that there is provided a first push switch and the operation body is operated in a direction perpendicular to the axis of rotation of the operation body to thereby operate the first push switch.

As fourth solution means, the rotatively-operated electrical component is constructed such that there is provided a driving member for operating the first push switch and by the operation of the operation body in a direction perpendicular to the axis of rotation thereof, the first push switch is operated through the driving member.

As fifth solution means, the rotatively-operated electrical component is constructed such that the operation body is disposed on the side of one surface of the rotary member, and the driving member is disposed on the side of the other surface.

As sixth solution means, the rotatively-operated electrical component is constructed such that the driving member is rotatably supported, the driving member is provided integrally with the bearing member, and by the operation of the operation body in a direction perpendicular to the axis of rotation thereof, the driving member is rotated with the shaft portion as a supporting point.

As seventh solution means, the rotatively-operated electrical component is constructed such that on the side of one surface of said rotary member, there are disposed said operation body and said bearing member to which said operation body is mounted, and which is rotatably supported, on the side of the other surface, there are disposed said driving member and said first push switch, and an arm portion of said driving member engages with said bearing member, and by the operation of said operation body in a direction perpendicular to the axis of rotation thereof, said bearing member rotates with the shaft portion as a supporting point to thereby rotate said driving member with the shaft portion as an supporting point.

As eighth solution means, the rotatively-operated electrical component is constructed such that it has a mounting member, and the driving member and the first push switch are mounted to the mounting member.

As ninth solution means, the coordinate input device is constructed such that the rotatively-operated electrical component is used as the input device.

As tenth solution means, the coordinate input device is constructed such that the rotatively-operated electrical component is accommodated within a case for the coordinate input device, and a part of the operation knob mounted to the operation body is caused to project outwardly from the opening in the case.

As eleventh solution means, the rotatively-operated electrical component is constructed such that a second push switch is provided, the operation body is made movable at least to one of the left and right in the axial direction, and the second push switch is operated by the movement of the operation body in the axial direction.

As twelfth solution means, the rotatively-operated electrical component is constructed such that a driving member for operating the first push switch is provided, and the first push switch is operated through the driving member when the operation body moves in a direction perpendicular to the axial direction of the rotary member.

As thirteenth solution means, the rotatively-operated electrical component is constructed such that there is provided a guide portion for guiding the driving member when the driving member moves in a direction perpendicular to the axial direction of the operation body.

As fourteenth solution means, the rotatively-operated electrical component is constructed such that the Oldham's coupling is constituted by fitting the convex portion having a restraining portion into the concave ridge portion having a restraining portion and these both restraining portions are engaged with each other to prevent it from coming off in the axial direction.

DETAILED DESCRIPTION OF PREFERRED EMBODIMENTS

Figure 1:
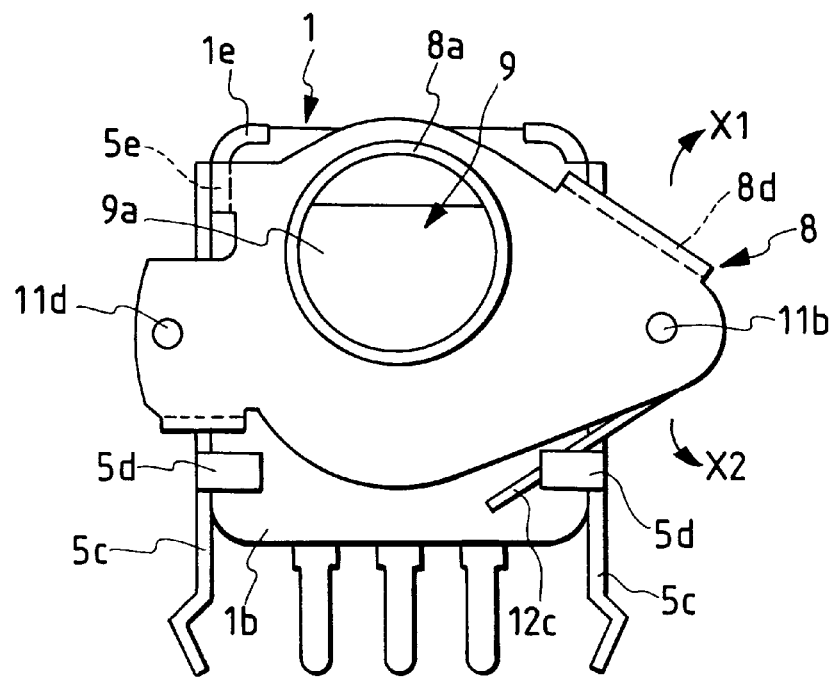
FIG. 1 is a front view showing a rotatively-operated electric component according to a first embodiment of the present invention.
Figure 2:
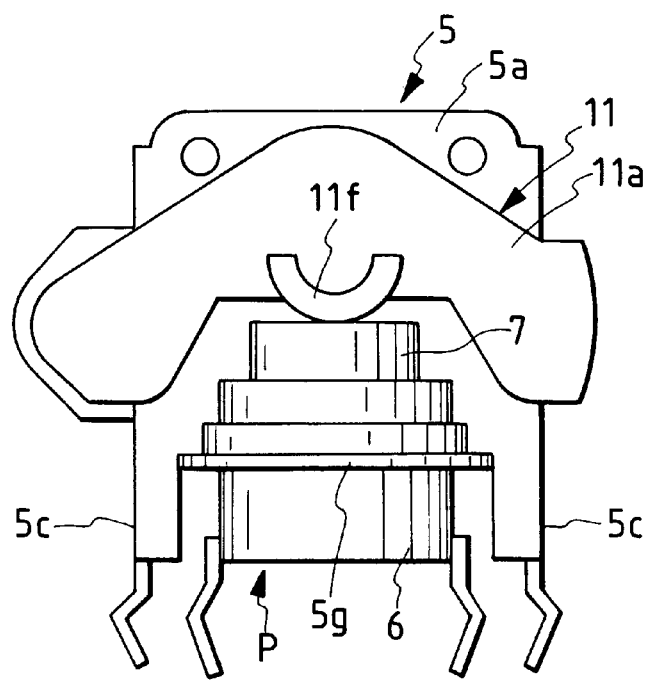
FIG. 2 is a rear view showing the rotatively-operated electric component of FIG. 1.
Figure 3:
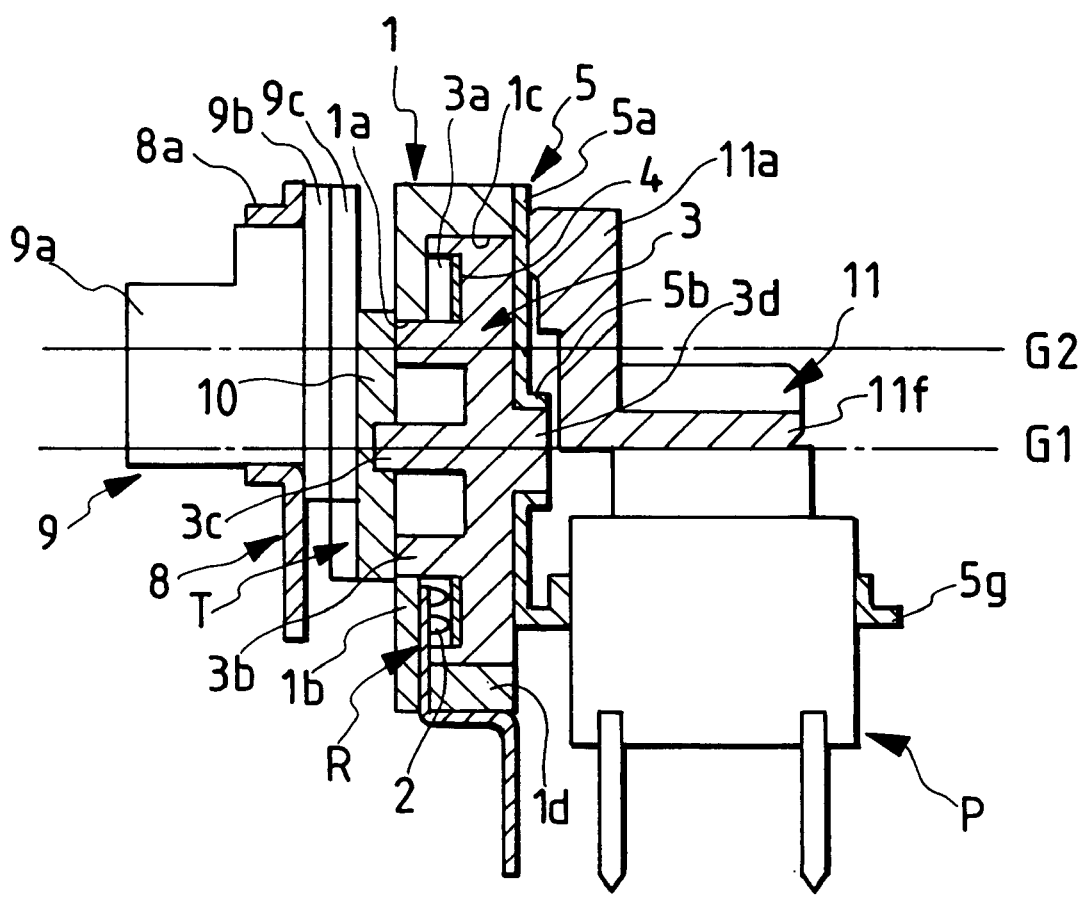
FIG. 3 is a sectional view of principal parts showing the rotatively-operated electric component of FIG. 1.
Figure 4:
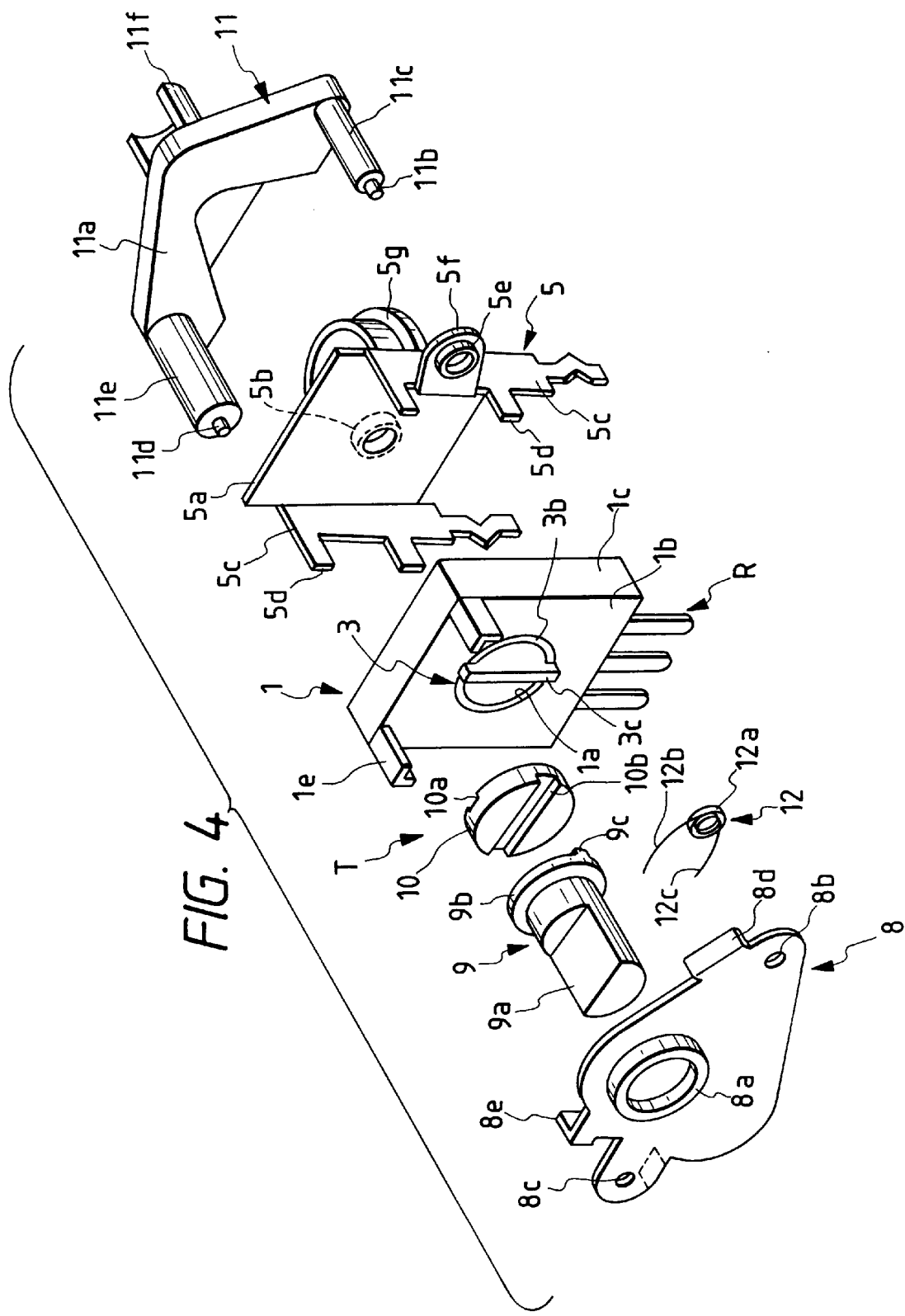
FIG. 4 is an exploded perspective view showing the rotatively-operated electric component, except a switch, of FIG. 1.
Figure 5:
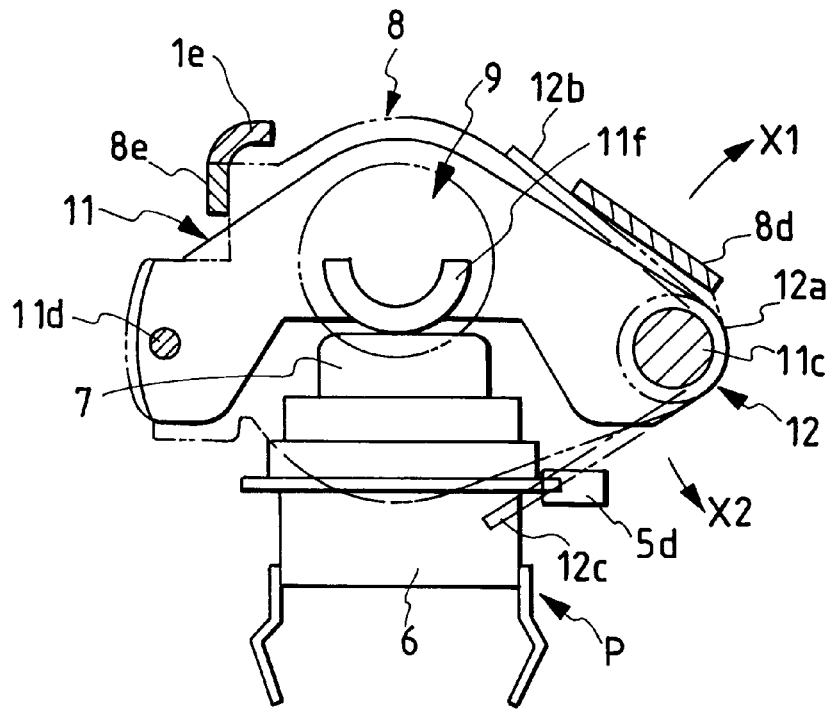
FIG. 5 is an explanatory view showing the operation of the rotatively-operated electric component of FIG. 1.
Figure 6:
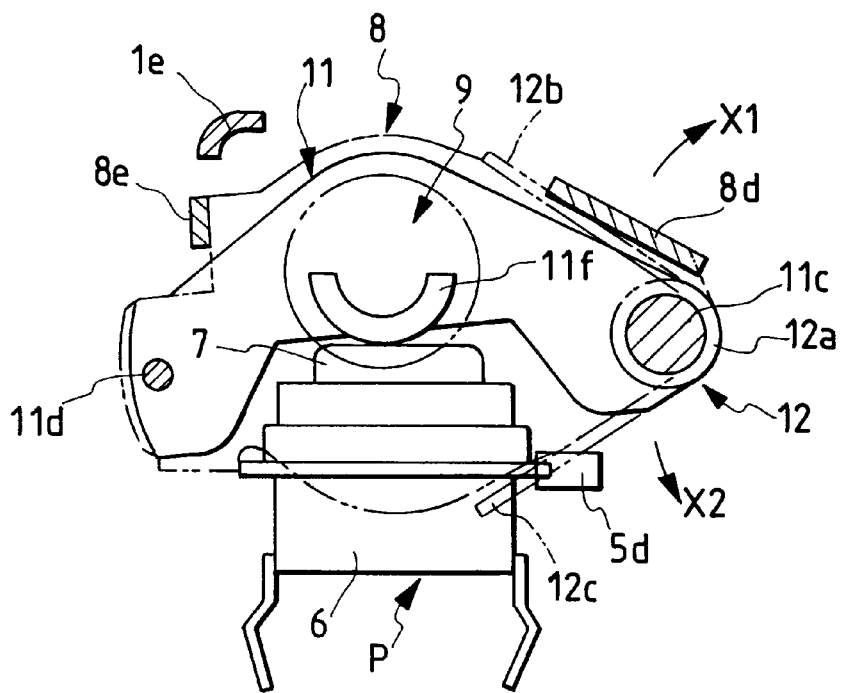
FIG. 6 is an explanatory view showing the operation of the rotatively-operated electric component of FIG. 1.
Figure 7:
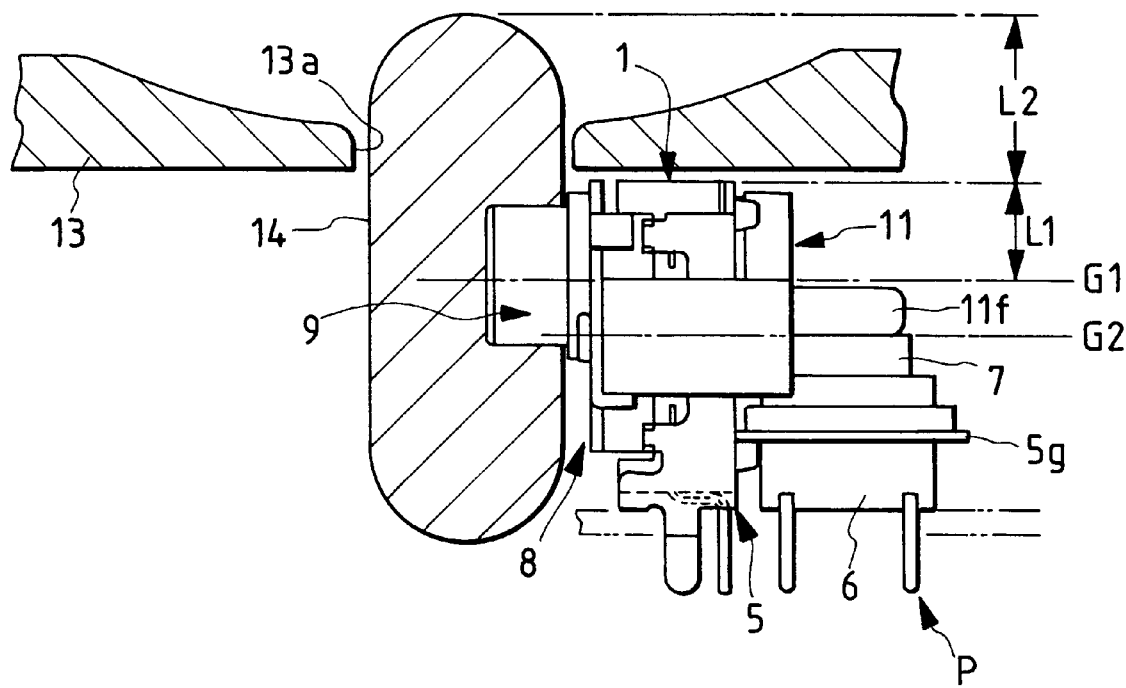
FIG. 7 is an explanatory view showing a coordinate input device using, as an input unit, the rotatively-operated electric component of FIG. 1 according to the present invention.

With reference to FIGS. 1 to 7, the description will be made of a rotatively-operated electric component according to a first embodiment of the present invention and a coordinate input device using this rotatively-operated electric component. FIG. 1 is a front view showing a rotatively-operated electric component according to the present invention; FIG. 2 is a rear view showing the rotatively-operated electric component according to the present invention; FIG. 3 is a sectional view of principal parts showing the rotatively-operated electric component according to the present invention; FIG. 4 is an exploded perspective view showing the rotatively-operated electric component, except a switch, according to the present invention; FIG. 5 and FIG. 6 are explanatory views showing the operation of the rotatively-operated electric component according to the present invention; and FIG. 7 is an explanatory view showing a coordinate input device using, as an input unit, the rotatively-operated electric component according to the first embodiment of the present invention.

The rotatively-operated electric component according to the first embodiment of the present invention will be described with reference to FIGS. 1 to 6. A rotary electric component member R comprises a fixed contact segment 2 embedded in a housing 1 made of a molded part of synthetic resin, and a conductive pattern 4 embedded in a rotatable rotary member 3 made of a molded part of synthetic resin, for slidably contacting with the contact segment 2.

The housing 1, which is cylindrical, comprises a front wall 1b having a hole 1a, a cylindrical side wall 1d provided with a hollow portion 1c whose rear portion is opened, and a projection 1e provided at the corner portion of the front wall 1a, and the contact segment 2 is located within the hollow portion 1c.

The rotary member 3, which is circular, comprises a recess 3a provided with a conductive pattern 4, an annulus ring portion 3b provided on the front surface, a convex portion 3c which crosses the center of the annulus ring portion 3b and projects forward, and a shaft portion 3d provided in the rear portion. This rotary member 3 is rotatably accommodated within the hollow portion 1c of the housing 1 and the annulus ring portion 3b fits in the hole 1a in the housing 1.

A mounting member 5 consisting of a metallic plate comprises a plane-shaped base 5a, a barrel-shaped portion 5b provided at the central portion of the base 5a, for projecting backward, a pair of mounting arm portions 5c formed by bending at right angles forward from the side ends of the base 5a, a plurality of projecting pieces 5d each projectedly provided forward from the end portion of the mounting arm portion 5c, a supporting piece 5f provided at one of the mounting arm portions 5c, having a hole 5e, and for extending sideways, and a mounting portion 5g formed by bending at right angles backward from the lower end of the base 5a.

Such a mounting member 5 is superposed on the housing 1 so that the rear surface of the housing 1 accommodating the rotary member 3 is covered with the base 5a and the housing 1 is interposed between the pair of mounting arm portions 5c.

At this time, the shaft portion 3d of the rotary member 3 fits in the barrel-shaped portion 5b.

Thus, by bending the projecting pieces 5d of the mounting member 5 on the front wall 1b side of the housing 1 by caulking, the housing 1 and the rotary member 3 are mounted to the mounting member 5.

In this case, one of the projecting pieces 5d is semicaulked so that its tip end is floating from the front wall 1b.

When the housing 1 and the rotary member 3 are mounted to the mounting member 5 in this way, the conductive pattern 4 is caused to be movable into and out of touch with the contact segment 2, and when the rotary member 3 rotates about the axis G of rotation thereof, the conductive pattern 4 moves into and out of touch with the contact segment 2 to switch the contact for outputting an electric signal.

A push switch P comprises a housing 6 made of synthetic resin, provided with a contact portion (not shown), and an operation button 7 mounted to the housing 6 so as to operate the contact portion, and always depressed by a spring (not shown), and this switch P is mounted to the mounting portion 5g of the mounting member 5 by forced fitting or by another appropriate way.

It goes without saying that switch P having any structures other than the above-described one is also applicable.

A bearing member 8 consisting of a metal plate and the like comprises a barrel-shaped portion 8a provided at the central part, holes 8b and 8c provided in the vicinity of both ends, a bent-up piece 8d bent backward in the vicinity of one end, and a stopper piece 8e bent backward in the vicinity of the other end.

An operation body 9 consisting of a molded part of synthetic resin and the like comprises an operation part 9a, a flange portion 9b provided at one end of the operation part 9a, and a convex portion 9c which crosses the center of the flange portion 9b and projects backward.

This operation body 9 is rotatably mounted to the bearing member 8 in such a manner that the operation part 9a is inserted through the barrel-shaped portion 8a in the bearing member 8.

The bearing member 8 and the operation body 9 are disposed on the front side, which is one surface side of the housing 1 and the rotary member 3.

Between the operation body 9 and the rotary member 3, there is an Oldham's coupling T for enabling the operation body 9 both to rotate and to move in a direction perpendicular to the axial direction. This Oldham's coupling T comprises a convex portion 3c provided at the rotary member 3, a convex portion 9c provided at the operation body 9 and a transmission unit 10 provided between the convex portions 3c and 9c.

The transmission unit 10 is provided with a concave ridge portion 10a on one surface thereof, and with a concave ridge portion 10b on the other surface thereof in a direction orthogonal to the concave ridge portion 10a in such a manner that the convex portion 3c of the rotary member 3 fits in the concave ridge portion 10a, and the convex portion 9c of the operation body 9 fits in the concave ridge portion 10b for combination.

In such an Oldham's coupling T, when the operation part 9 is rotated on the axis G2 of rotation thereof, the convex portion 9c rotates to thereby rotate the transmission unit 10 by the concave ridge portion 10b in which the convex portion 9c fits, further the rotation of the transmission unit 10 is transmitted to the convex portion 3c which fits in the concave ridge portion 10a to rotate the rotary member 3, thus switching the contact of the electric component member R.

Also, on moving the operation body 9 in a direction perpendicular to the axis G2 of rotation thereof, sliding operation is performed between the convex portion 3c and the concave ridge portion 10a, and between the convex portion 9c and the concave ridge portion 10b so that the operation body 9 can be moved in the perpendicular direction without rotating the rotary member 3.

A driving member 11 consisting of a molded part of synthetic resin comprises a mountain-shaped base 11a, a shaft portion 11c provided at one end of the base 11a, having a protrusion 11b at the tip end thereof and for extending forward, an arm portion 11e provided at the other end of the base 11a, having a protrusion 11d at the tip end thereof, and for extending forward, and a semi-cylindrical actuation unit 11f provided on the rear surface of the base 11a, for extending backward.

This driving member 11 is disposed on the rear side of the mounting member 5, and the housing 1 is located between the shaft portion 11c and the arm portion 11e by inserting the shaft portion 11c through a hole 5e in a supporting piece 5f of the mounting member 5. The protrusion 11b is inserted through the hole 8b in the bearing member 8, and the protrusion 11d is inserted through the hole 8c, and the tip ends of the protrusions 11b and 11d are caulked to thereby make the driving member 11 and the bearing member 8 integral with each other.

When the bearing member 8 and the driving member 11 are thus made integral with each other, the arm portion 11e side, which is the other end side, and the side of the hole 8c in the bearing member 8 become rotatable with the shaft portion 11c of the driving member 11 as a supporting point, and as a result, the operation body 9 also becomes rotatable with the shaft portion 11c as a supporting point, and becomes movable in a direction perpendicular to the axis G2 of rotation.

Also, when they are made integral, the base 11a of the driving member 11 abuts on the base 5a of the mounting member 5 so that the flange portion 9b of the operation body 9 and the transmission unit 10 are interposed between the bearing member 8 and the rotation member 3, and so that the stopper piece 8e of the bearing member 8 is in a position facing to the protrusion 1e of the housing 1.

In order to install an U-shaped spring 12, the shaft portion 11c is inserted through its ring-shaped portion 12a, and one end 12b thereof is engaged with the bent-up piece 8d of the bearing member 8 while the other end 12c is engaged with the projecting piece 5d semi-caulked of the mounting member 5.

When the spring 12 is installed, the press 12 presses the bearing member 8 in a direction (clockwise direction) indicated by an arrow X1 so that the stopper piece 8e of the bearing member 8 impinges on the projection 1e of the housing 1 to stop the movement of the bearing member 8 in a direction indicated by an arrow X1. Thus, a round portion of the actuation unit 11f of the driving member 11 abuts on or is positioned close to the operation button 7 of the switch P.

Further, when they are mounted, as shown in FIGS. 3 and 7, the operation body 9 is disposed in such a position that the axis G2 of rotation thereof is deviated from the axis G1 of rotation of the rotary member 3.

A rotatively-operated electric component thus constructed is provided, as shown in FIG. 3, with the mounting member 5, the driving member 11 and the switch P on the rear surface side, which is the other side of the housing 1 and the rotary member 3. The actuation unit 11f and the operation button 7 are abutted to each other at a height of the axis G1 of rotation of the rotary member 3.

In this respect, the height of position of abutting can be made flexible by changing the mounting position of the switch P and the formation position of the actuation unit 11f, and the degree of freedom in the layout of the switch P can be provided.

The operation of a rotatively-operated electric component constructed as described above will be described. In FIG. 3, first when it is rotated, the operation body 9 rotates on the axis G2 of rotation.

Then, the rotary member 3 rotates on the axis G1 of rotation through the convex portion 9c, the concave ridge portions 10b and 10a, and the convex portion 3c, which constitute the Oldham's coupling T, and the conductive pattern 4 also rotates to move into and out of touch with the contact segment 2 so that the contact is switched to output an electric signal.

Next, on depressing and moving the operation body 9 in a direction perpendicular to the axis G2 of rotation in the state shown in FIG. 5, the operation body 9 rotates with the shaft portion 11c as a supporting point together with the mounting member 5 in a direction indicated by an arrow X2 against the force of the spring 12 which resiliently presses the mounting member 5 as shown in FIG. 6.

Then, as the stopper piece 8e separates from the projection 1e, the driving member 11 rotates with the shaft portion 11c as a supporting point together with the mounting member 5 in a direction indicated by an arrow X2.

At this time, the actuation unit 11f of the driving member 11 depresses the operation button 7 of the switch P to switch the contact for outputting an electric signal.

During the movement of the operation body 9 in a perpendicular direction from FIG. 5 to FIG. 6, sliding operation is performed in the Oldham's coupling T between the convex portion 9c and the concave ridge portion 10b, and between the concave ridge portion 10a and the convex portion 3c, and the operation body 9 can be moved in a perpendicular direction without rotating the rotary member 3.

In the state shown in FIG. 6, when the depressing force on the operation body 9 is removed, the mounting member 5 is returned with the shaft portion 11c as a supporting point in a direction indicated by an arrow X1 by the force of the spring 12, and the stopper piece 8e impinges on the projection 1e to stop the movement of the mounting member 5 as shown in FIG. 5. With the movement of this mounting member 5, both the operation body 9 and the driving member 11 return to the original state, and since the depressing pressure of the actuation unit 11f on the operation button 7 is removed, the operation button 7 also returns to the original state by a built-in return spring so that the contact is switched.

During that period, the Oldham's coupling T is capable of moving the operation body 9 without rotating the rotary member 3 in accordance with the same principle as in the above-described operation.

Thus, the rotatively-operated electric component is operated.

In the above-described embodiment, the mounting member 5, the operation body 9 and the driving member 11 are returned by the spring 12, which is a separate part, but it may be possible to return them by a return spring for the switch P. Also, for the actuation unit 11f, the description has been made of the semi-cylindrical one, but it is better to form it into the shape of a cylinder, a column or the like and to have a round abutted surface on the operation button 7 because the abutted surface becomes slippery.

In the case of applying such a rotatively-operated electric component to a coordinate input device such as, for example, a mouse for use with computer, as shown in FIG. 7, a rotatively-operated electric component is accommodated and mounted within a case 13 for the coordinate input device, and the operation knob 14 is mounted to the operation body 9 of the rotatively-operated electric component in such a manner that the operation knob 14 is caused to project outwardly from the opening 13a in the case 13 so as to be operated.

By the operation of such a coordinate input device, a menu is displayed on a display by means of, for example, a member not shown here.

Next, a desired menu is decided by depressing the operation knob 14 to operate the switch P, and thereafter by rotating the operation knob 14 to operate the electric component member R, items and the like on the menu are displayed.

In such a coordinate input device, as can be seen from FIG. 7, since the operation body 9 is provided at a position in which the axis G2 of rotation thereof is deviated from the axis G1 of rotation of the rotary member 3, the operation body 9 to which the operation knob 14 is mounted can be brought close to the case 13. To this end, a radius of the operation knob 14 becomes equal to a sum of a length L1 between the axis G2 of rotation of the operation body 9 and the outer surface of the housing 1 and a length L2 required for projecting the operation knob 14 outwardly, and the operation knob 14 and the coordinate input device can be miniaturized as compared with the conventional ones.

Figure 8:
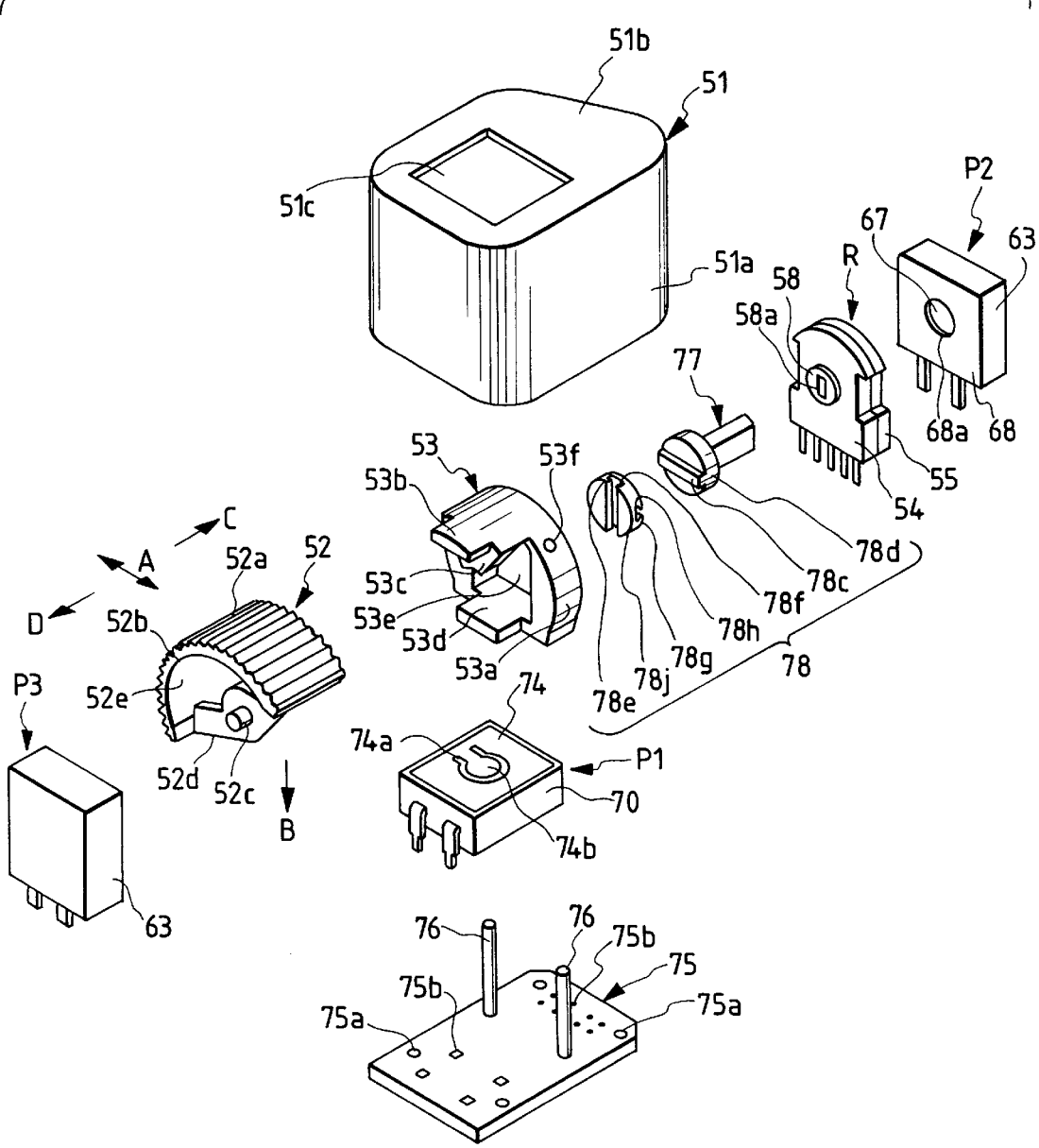
FIG. 8 is an exploded perspective view showing a rotatively-operated electric component according to a second embodiment of the present invention.
Figure 9:
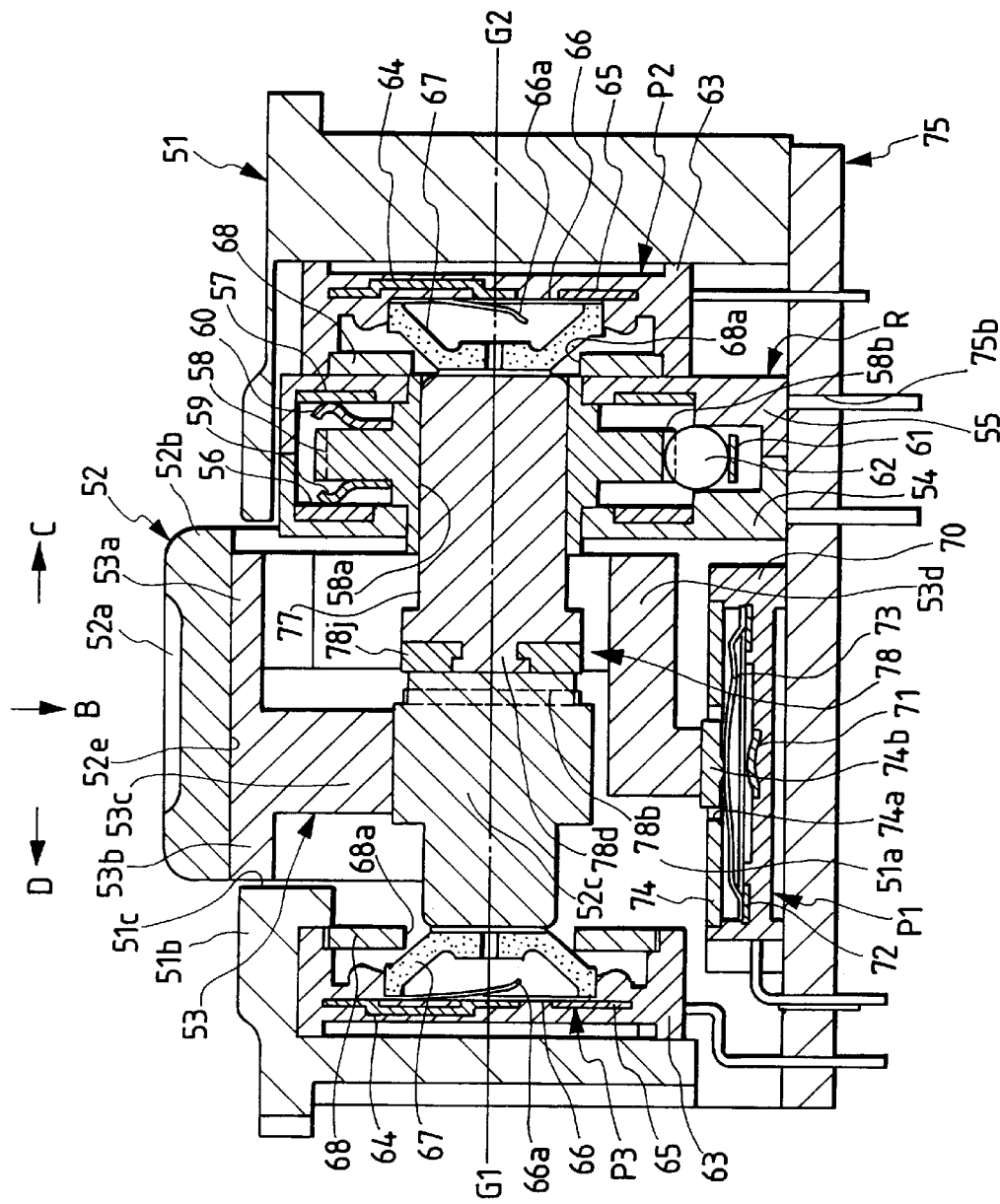
FIG. 9 is a sectional view of principal parts showing the rotatively-operated electric component of FIG. 8.
Figure 10:
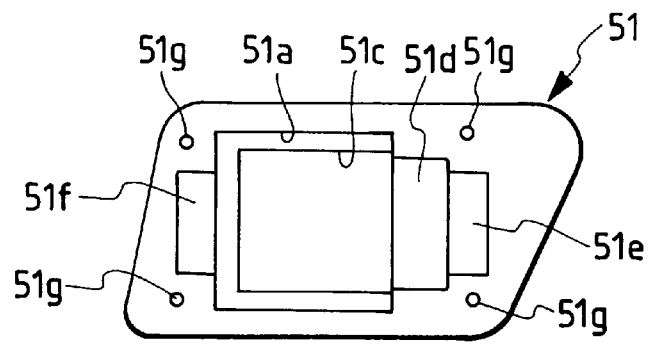
FIG. 10 is a bottom view showing a case for the rotatively-operated electric component of FIG. 8.
Figure 11:
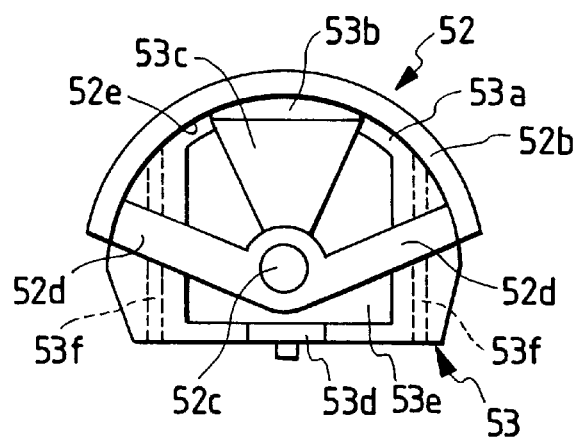
FIG. 11 is a front view showing a combined state between the operation body and the driving member for the rotatively-operated electric component of FIG. 8.
Figure 12:
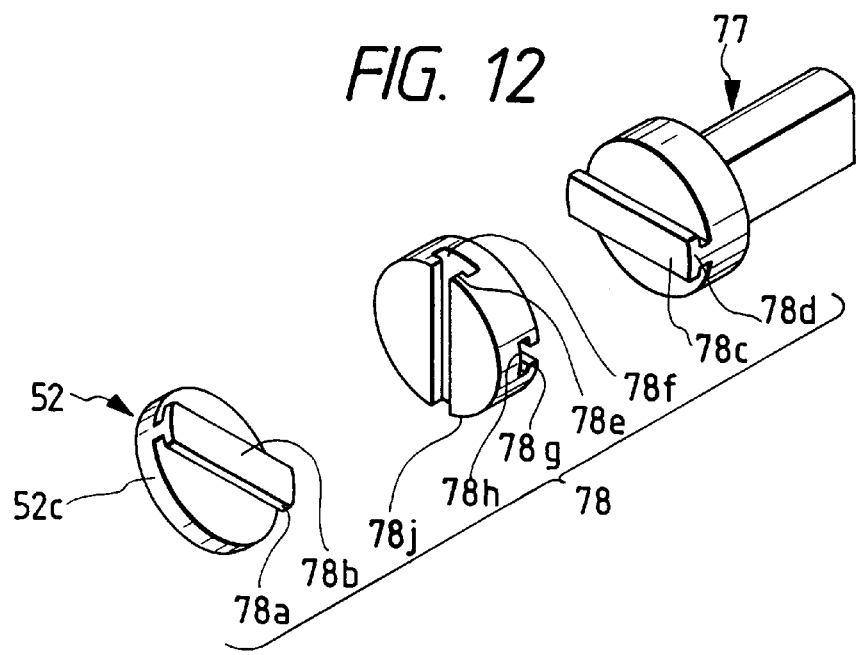
FIG. 12 is an exploded perspective of principal parts for explaining an Oldham's coupling for the rotatively-operated electric component of FIG. 8.

One embodiment of a rotatively-operated electric component according to the first embodiment of the present invention will be described with reference to FIGS. 8 to 12. FIG. 8 is an exploded perspective view showing a rotatively-operated electric component according to the present invention; FIG. 9 is a sectional view of principal parts showing a rotatively-operated electric component according to the present invention; FIG. 10 is a bottom view showing a case for a rotatively-operated electric component according to the present invention; FIG. 11 is a front view showing a combined state between the operation part and the driving body for a rotatively-operated electric component according to the present invention; and FIG. 12 is an exploded perspective of principal parts for explaining an Oldham's coupling for a multi-directional input device according to the present invention.

A case 51 consisting of a molded part of synthetic resin is a box-shaped one whose interior is a hollow portion 51a, and a hole 51c is provided on the upper wall 51b. As shown in FIG. 10, contiguous to the hollow portion 51a, two recesses 51d, 51e on one side, and one recess 51f on the other side are formed in opposed relationship with each other respectively, and a plurality of protrusions 51g are formed on the lower surface.

An operation body 52 consisting of a molded part of synthetic resin comprises a semi-cylindrical knob portion 52b having a knurled portion 52a on its outer periphery, a shaft portion 52c located at the center of rotation of the knob portion 52b, a pair of arm portions 52d for connecting this shaft portion 52c to the knob portion 52b, and a fan-shaped hole 52e formed between the arm portion 52d and the knob portion 52b. This operation body 52 is inserted into the hollow portion 51a in the case 51 in such a manner that the knob portion 52b projects outwardly from the hole 51c.

A driving member 53 (bearing member) consisting of a molded part of synthetic resin, and having an external shape of a horseshoe is provided with a circular outer peripheral wall 53a along the inner peripheral surface of the knob portion 52b, an extended wall 53b partially projecting in the axial direction along the upper portion of the outer peripheral wall 53a, a supporting portion 53c formed on the lower surface of this extended wall 53b, extending toward the center, a projection 53d located at the lower part of the outer peripheral wall 53a, a hole 53e formed at the central part, and a pair of slots 53f extending through from the lower part of the outer peripheral wall 53a upwardly so as to sandwich this hole 53e therebetween.

In the driving member 53, as shown in FIGS. 9 and 11, the extended wall 53b is inserted into the hole 52e in the operation body 52 to bring the extended wall 53b and the outer peripheral wall 53a into contact with the inner peripheral surface of the knob portion 52b of the operation body 52. Also, an arcuate recess provided at the tip end of the supporting portion 53c is caused to abut on the outer peripheral surface of the shaft portion 52c of the operation body 52 so that the driving member 53 and the operation body 52 are combined and the operation body 52 is mounted on the driving member 53. Accordingly, the driving member 53 fulfills a function as a bearing member for the operation body 52.

The operation body 52 combined is rotatable with the outer peripheral wall 53a of the driving member 53 as a guide, and its range of rotation is a range in which a pair of arm portions 52d impinge on the end portion of the extended wall 53b. In this embodiment, it is rotatable within an angle of about 120°.

The operation body 52 is capable of laterally moving in the axial direction of the shaft portion 52c with the driving member 53 as a guide. Since the shaft portion 52c of the operation body 52 is supported by the supporting portion 53c of the driving member 53, and the knob portion 52b of the operation body 52 is supported by the outer peripheral wall 53a of the driving member 53, the operation body 52 is adapted to be able to move to the left or right with the outer peripheral wall 53a of the driving member 53 and the supporting portion 53c as a guide when the operation body 52 is depressed in the axial direction.

The rotatively-operated electric component is provided with a rotary electric component member R consisting of a rotary switch, a rotary encoder and the like, and in this embodiment, an unitized rotary encoder is used. In this unitized electric component member R, as shown in FIGS.

8 and 9, fixed contacts 56 and 57 are embedded in insulating cases 54 and 55 made of synthetic resin respectively, and these two insulating cases 54 and 55 are caused to oppose to each other for being combined.

Within the insulating cases 54 and 55, there is provided a rotary member 58 which is rotatably supported by the insulating cases 54 and 55, and which has an oval-shaped hole 58a for inserting the shaft at the central portion. On both surfaces of the rotary member 58, there are mounted movable contacts 59 and 60 consisting of metallic spring plate which move into and out of touch with the fixed contacts 56 and 57, and a ball 62, which is resiliently depressed by a spring 61, abuts on an uneven portion 58b provided on the outer periphery of the rotary member 58 to constitute a moderating mechanism.

The electric component member R thus unitized is fitted into a recess 51d from the lower surface of the case 51, and is mounted within the case 51 to thereby facilitate the installation of the electric component member R.

The rotatively-operated electric component has also two push switches P2 and P3, unitized having the same structure, in which as shown in FIGS. 8 and 9, a fixed contact 64 consisting of a metal plate and a lead-through terminal 65 are embedded in an insulating case 63 made of synthetic resin, and a movable contact 66 consisting of a metal spring plate is accommodated in the insulating case 63 in such a manner that the periphery of the movable contact 66 is always in contact with the lead-through terminal 65 and its cut and raised part 66a is in a position opposite to fixed contact 64 so as to be movable into and out of touch therewith.

Within the insulating case 63, there is disposed a dome-shaped movable body 67 made of resilient rubber, and a cover 68 having an opening 68a at its central part is provided so as to cover the opening in the insulating case 63.

The push switch P2 thus unitized is fitted into the recess 51e in the case 51, and is mounted in such a manner that the push switch P2 is superposed on the electric component member R and the hole 58a for inserting the shaft faces to the opening 68a, while the push switch P3 is fitted into the recess 51f in the case 51 and is mounted in a state opposite to the other push switch P2.

The push switches P2 and P3 can be installed only by inserting them into the recesses 51e and 51f respectively, which facilitates the installation.

Further, the rotatively-operated electric component has a first push switch P1, unitized in which as shown in FIGS. 8 and 9, a fixed contact 71 consisting of a metal plate and a lead-through terminal 72 are embedded in an insulating case 70 made of synthetic resin, and a dome-shaped movable contact 73 consisting of a metal spring plate is accommodated within the insulating case 70 in such a manner that the periphery of the movable contact 73 is always in contact with the lead-through terminal 72 and its central portion is in a position opposite to the fixed contact 71 so as to be movable into and out of contact therewith.

A movable body 74 consisting of an insulating plate, which also serves to cover an open portion in the lower part of the insulating case 70, is provided with a cut portion 74a, at the central portion of which a movable piece 74b is formed. This movable body 74 is mounted to the insulating case 70 so as to cover the open portion, and when it is mounted, the movable piece 74b is in a position opposite to the dome-shaped movable contact 73.

An insulating substrate 75 consisting of a printed circuit board and the like comprises, as shown in FIGS. 8 and 9, a plurality of holes 75a for inserting protrusions 51g of the case 51, and a plurality of holes 75b for inserting through terminals of the electric component member R and the push switches P1, P2 and P3, and a pair of supporting members 76 consisting of metallic columnar rods are fixed to the insulating substrate 75.

The pair of supporting members 76 are inserted into slots 53f in the driving member 53 respectively to constitute a guide portion, which prevents the driving member 53 from moving in the axial direction and in the rotating direction, but is adapted to support so as to enable the driving member 53 to move while guiding in the movement in a direction perpendicular to the axial direction.

The first push switch P1 is mounted to the insulating substrate 75, and the insulating substrate 75 is mounted to the lower part of the case 51 by inserting the protrusions 51f into the holes 75a respectively so as to cover the open portion in the lower part of the case 51.

When the insulating substrate 75 is mounted, terminals of the electric component member R and the push switches P1, P2 and P3 are inserted through the holes 75b respectively and project outwardly, and the movable piece 74b of the movable body 74 of the first push switch P1 is in a position opposite to the projection 53d of the driving member 53.

Further, between a non-circular shaft 77 made of metal or the like, capable of rotation and movement in the axial direction, and the operation body 52, there is provided an Oldham's coupling 78 as shown in FIGS. 8, 9 and 12, and this Oldham's coupling 78 enables the operation body 52 to rotate, to move in the lateral axial direction and to move in a direction perpendicular to the axial direction.

Figure 14:
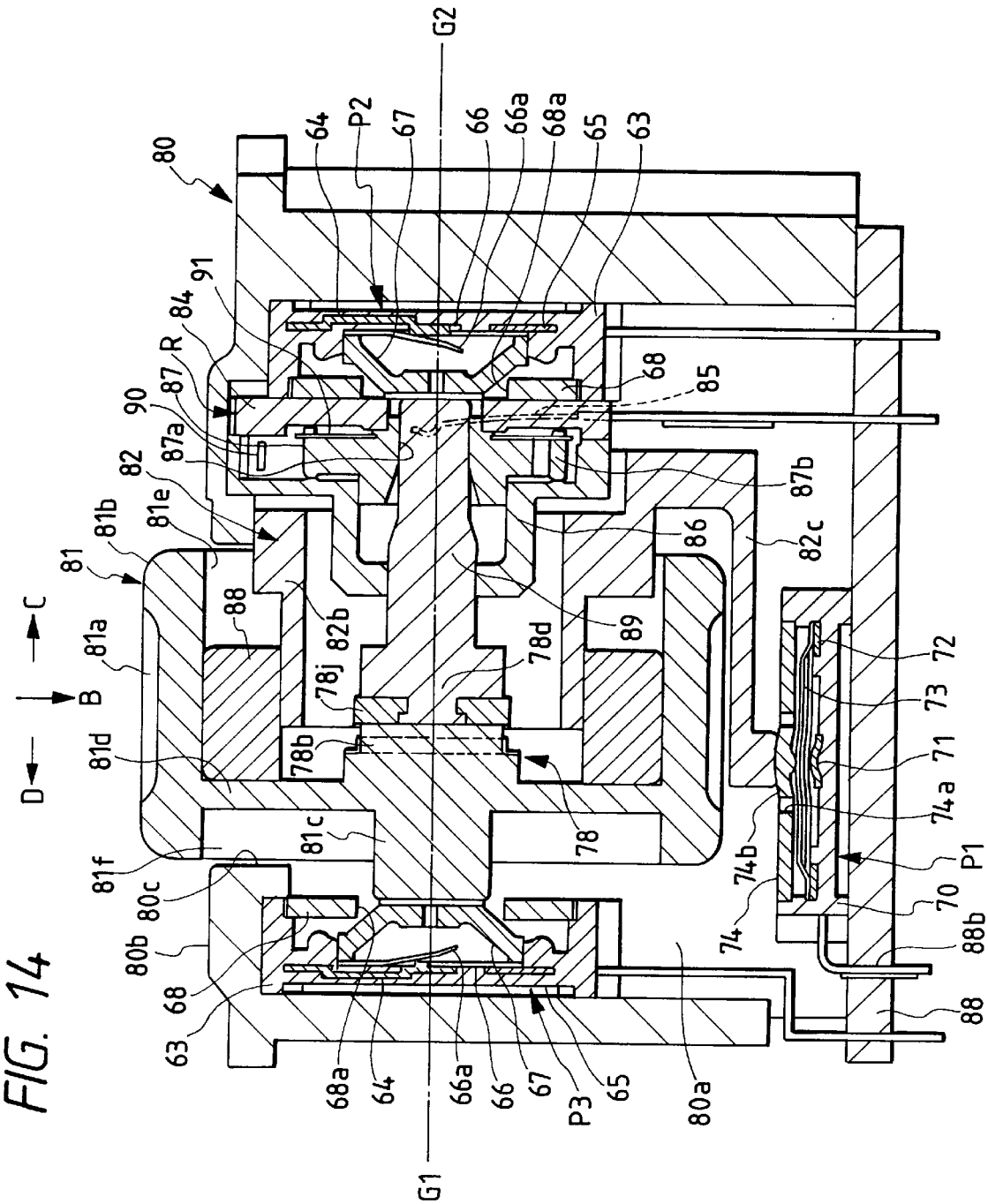
FIG. 14 is a sectional view of principal parts showing the rotatively-operated electric component of FIG. 13.
Figure 15:
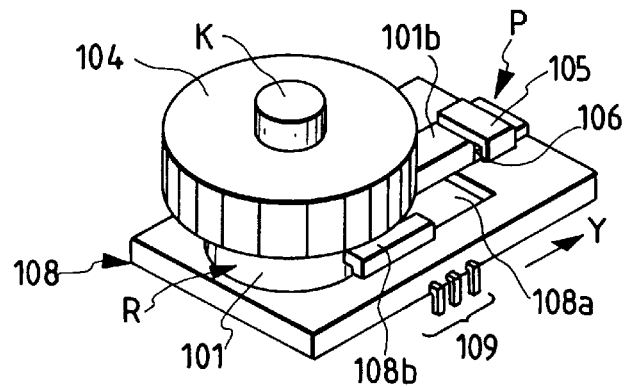
FIG. 15 is a perspective view showing a conventional rotatively-operated electric component.
Figure 16:
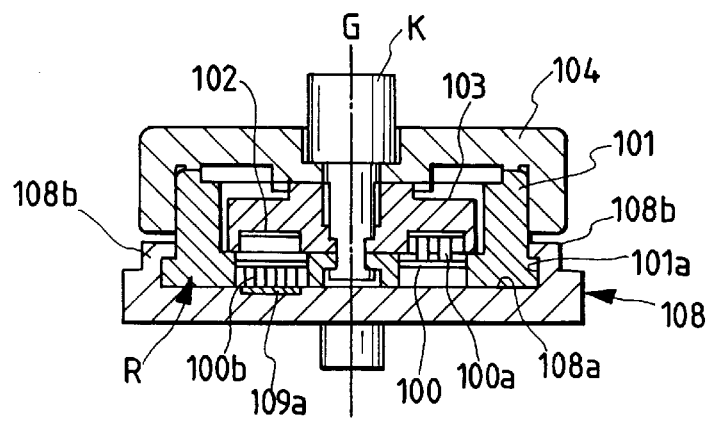
FIG. 16 is a sectional view of principal parts showing a conventional rotatively-operated electric component.
Figure 17:
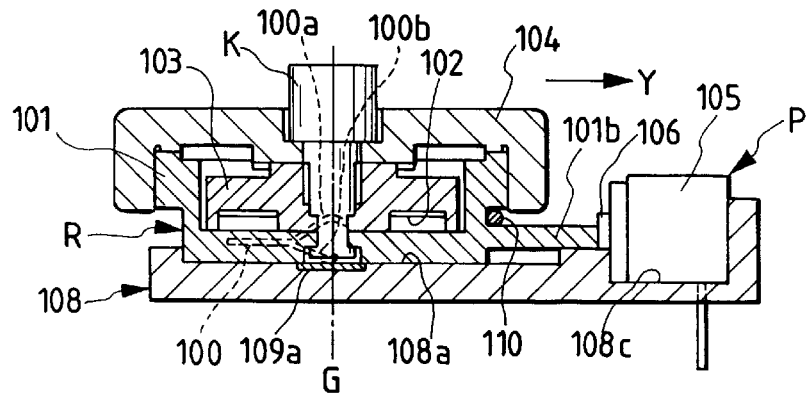
FIG. 17 is a sectional view of principal parts showing a conventional rotatively-operated electric component.
Figure 18:
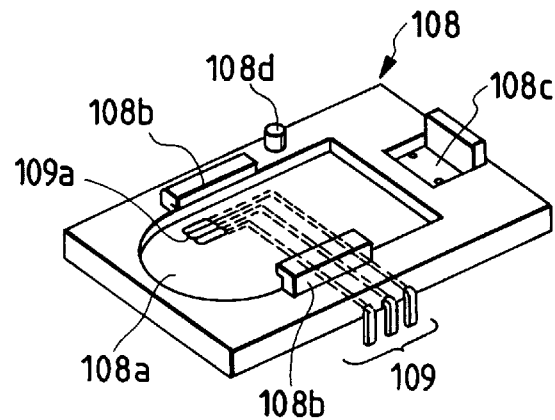
FIG. 18 is a perspective view showing an insulating substrate for a conventional rotatively-operated electric component.
Figure 19:
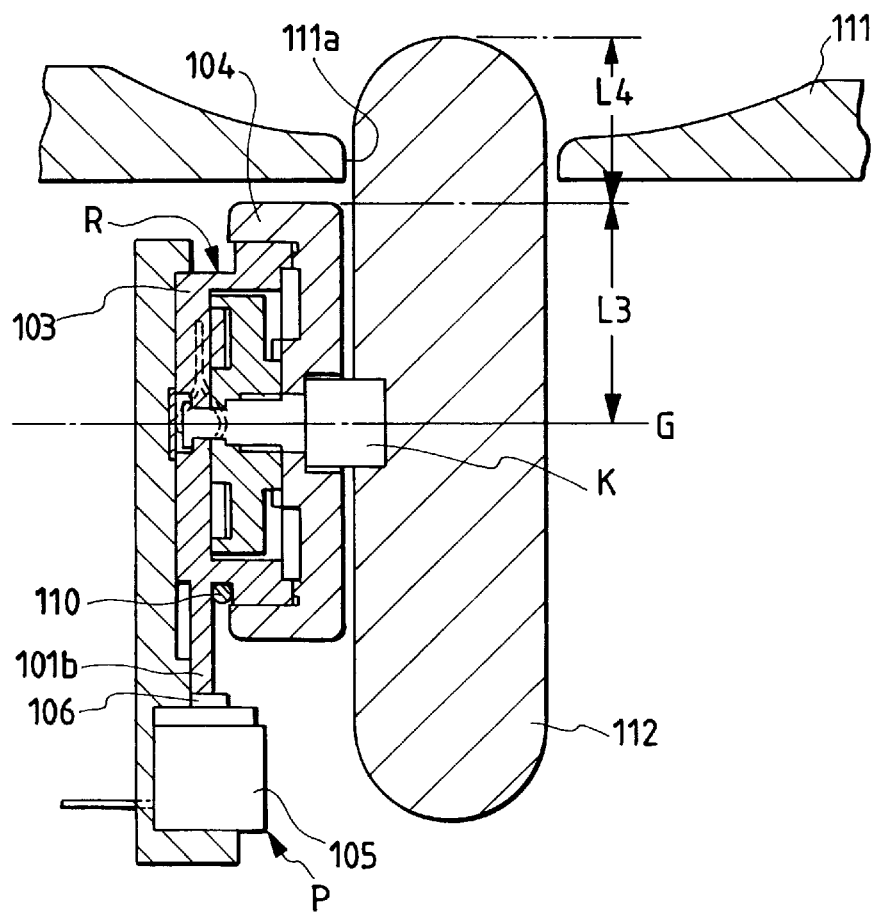
FIG. 19 is an explanatory view showing a conventional coordinate input device.

The shaft 77 is inserted into the hole 58a in the rotary member 58 of the electric component member R and is mounted, and the Oldham's coupling 78 is, as shown in FIGS. 8, 9 and 14, formed between the operation body 52 and the shaft 77 capable of rotation and movement in the axial direction. This Oldham's coupling 78 comprises a convex restraining portion 78a, a T-shaped convex portion 78b provided at one end of the shaft portion 52c of the operation part 52, a T-shaped convex portion 78d having a convex restraining portion 78c, provided at one end of the shaft 77, and a transmission unit 78j disposed between the operation body 52 and the shaft 77, provided with a T-shaped concave ridge portion 78f having a restraining portion 78e on one surface, and provided with a T-shaped concave ridge portion 78h having a restraining portion 78g in a state orthogonal to the concave ridge portion 78f on the other surface.

In the Oldham's coupling 78, the convex portion 78b fits in the concave ridge portion 78f in the transmission unit 78j, and the convex portion 78d fits in the concave ridge portion 78h in the transmission unit 78j, and the restraining portions 78a and 78e are combined in a restrained state. Also the restraining portions 78c and 78g are combined in a restrained state.

In such an Oldham's coupling 78, when the operation body 52 is rotated, the convex portion 78b rotates to thereby rotate the transmission unit 78j by the concave ridge portion 78f in which the convex portion 78b fits. Further the rotation of the transmission unit 78j is transmitted to the convex portion 78d which fits in the concave ridge portion 78h to rotate the shaft 77, and further to thereby rotate the rotary member 58 of the electric component member R. thus switching the electric component member R.

Also, on moving the operation body 52 in a direction perpendicular to the axial direction of the shaft portion 52c, sliding operation is performed between the convex portion 78b and the concave ridge portion 78f, and between the convex portion 78d and the concave ridge portion 78h so that the operation body 52 can be moved in the perpendicular direction without rotating the shaft 77.

On moving the operation body 52 in the axial direction of the shaft portion 52c, the convex portions 78b, 78d and the transmission unit 78j can move the operation body 52 together with the transmission unit 78j and the shaft 77 without coming off between them by restraint of the respective restraining portions 78a, 78c, 78e and 78g.

When the shaft 77 is installed to the rotary member 58 of the electric component member R and the Oldham's coupling 78 is mounted, as shown in FIG. 9, one end of the shaft 77 is opposed to the opening 68a in the cover 68 for the push switch P2 and the movable body 67, and the shaft portion 52c is opposed to the opening 68a in the cover 68 for the push switch P3 and the movable body 67.

In the operation body 52 and the shaft 77 which have been combined by the Oldham's coupling 78, one end of the shaft 77 abuts on the movable body 67 of the push switch P2, and one end of the shaft portion 52c abuts on the movable body 67 of the push switch P3 in such a manner that the operation body 52 is maintained at the neutral position in a state of being interposed between both movable bodies 67.

The description will be made of an assembly method for a rotatively-operated electric component according to the present invention. First, the concave ridge portion 78f of the transmission unit 78j is caused to fit into the convex portion 78b of the operation body 52 from a direction perpendicular to the axial direction. Next, the convex portion 78d of the shaft 77 is caused to fit into the concave ridge portion 78h in the transmission unit 78j likewise from the perpendicular direction.

In this state, the outer peripheral wall 53a and the extended wall 53b of the driving member 53 are inserted into the hole 52e in the operation body 52 from the shaft 67 side, and the shaft 77 and the transmission unit 78j are inserted into the hole 53e in the driving member 53 so as to cause the outer wall portion 53a to abut on the inner peripheral surface of the knob portion 52b of the operation body 52, and to cause the supporting portion 53c to abut on the outer peripheral surface of the shaft portion 52c of the operation body 52 for installing the driving member 53 to the operation body 52.

The hole 58a in the rotary member 58 of the electric component member R is caused to fit into the shaft 77. In this state, the operation body 52 and the driving member 53 are inserted into the hollow portion 51a in the case 51, and the electric component member R is inserted into the recess 51d in the case 51 so as to project a part of the operation body 52 outwardly from the hole 51c. The electric component member R is mounted at the recess 51d.

Then, the push switches P2 and P3 are inserted into the recesses 51e and 51f in the case 51 respectively, and are mounted there.

The first push switch P1 is mounted to the insulating substrate 75, and this insulating substrate 75 is located below the case 51. The insulating substrate 75 is raised upwardly so that the supporting member 76 is inserted into the slot 53f in the driving member 53, and is caused to abut on the lower part of the case 51.

Then, the movable piece 74b of the movable body 74 of the push switch P1 abuts on the projection 53d of the driving member 53, and the protrusions 51g of the case 51 are inserted through the holes 75b in the insulating substrate 25, and further the terminals of the electric component member R, the push switches P1, P2 and P3 enter a state in which they are inserted through the holes 75b in the insulating substrate 75.

Thus, the tip ends of the protrusions 51g projected from the holes 75a in the insulating substrate 75 are deformed (not shown) so as to be widened by, for example, a trowel heated to complete the assembly of the rotatively-operated electric component.

The operation of the rotatively-operated electric component, having such structure, according to the present invention will be described. First, on moving the operation body 52 in a direction indicated by an arrow A in FIGS. 8 and 9 for rotation, the operation body 52 rotates on the shaft portion 52c with the outer peripheral wall 53a and the supporting portion 53c of the driving member 53 as a guide.

Then, by means of the Oldham's coupling 78, the rotary member 58 of the electric component member R rotates through the shaft 77.

The rotary member 58 rotates with a feeling of the click by the moderating mechanism consisting of a spring 61 and a ball 62, and the movable contacts 59 and 60 slide on the fixed contacts 56 and 57 to switch the contact. This switching of contact is adapted to be induced by the terminals of the fixed contacts 56 and 57 projectedly provided outwardly from the insulating substrate 75.

On depressing and moving the operation body 52 in a direction perpendicular to the axial direction of the shaft portion 52c, that is, in a direction indicated by an arrow B, the operation body 52 moves together with the driving member 53 with the supporting member 76 as a guide.

Then, the projection 53d of the driving member 53 depresses the movable piece 74b, which is a part of the movable body 74 of the first push switch P1. The movement of this movable piece 74b depresses a dome-shaped movable contact 73, which is reversed to come into contact with the fixed contact 71, and the fixed contact 71 is electrically connected to the lead-through terminal 72 to switch the contact. This switching of the contact is adapted to be induced by the fixed contact 71 and the lead-through terminal 72 which have been projectedly provided outwardly from the insulating substrate 75.

During the movement of the operation body 52 in a direction perpendicular thereto, the sliding operation is performed in the Oldham's coupling 28, that is, between the projection 78b and the concave ridge portion 78f, and between the projection 78d and the concave ridge portion 78h to thereby enable the axis G1 of the shaft portion 52c to be deviated from the axis G2 of the shaft 77. During the movement in the perpendicular direction, the Oldham's coupling 78 prevents the shaft portion 52c and the shaft 77 from rotating.

Then, on removing the depressing force on the operation body 52 in the perpendicular direction, the movable contact 74 is reversed by the force of the spring to return to its original state, and the contact with the fixed contact 71 is broken to switch the contact.

The reversing operation of the movable contact 73 causes the movable contact 73 to depress back the movable body 74, the driving member 53 and the operation body 52 upwardly.

Then, the axis G1 coincides with the axis G2, and during this period of time, the Oldham's coupling 78 prevents the shaft portion 52c and the shaft 77 from rotating by the same operation as described above.

On depressing and moving the operation body 52 in the axial direction of the shaft portion 52c, that is, in a direction indicated by an arrow C, the operation body 52 depresses the shaft 77 through the Oldham's coupling 78 with the outer peripheral wall 53a and the supporting portion 53c of the driving member 53 as a guide.

Then, the shaft 77 moves in the same direction with the hole 58a in the rotary member 58 as a guide, and this shaft 77 depresses the dome-shaped movable body 67 of the push switch P2. The movable body 67 is reversed to bring the cut and raised part 66a of the movable contact 66 into contact with the fixed contact 64, and the lead-through terminal 65 is electrically connected to the fixed contact 64 to switch the contact. This switching of the contact is adapted to be induced by the fixed contact 64 and the lead-through terminal 65 which have been projectedly provided outwardly from the insulating substrate 75.

Next, on removing the depressing force of the operation body 52 in a direction indicated by an arrow C, the movable body 67 is reversed by the force of the spring to return to the original state, and the cut and raised part 66a is also returned to the original state by the force of the spring, that is, a state in which the contact with the fixed contact 64 has been broken to switch the contact.

The reversing operation of the movable body 67 causes the movable body 67 to depress back the shaft 77, the Oldham's coupling 78 and the operation body 52 to the original state, and the operation body 52 is located in a neutral position interposed between the movable bodies 67 of the push switches P2 and P3.

On depressing and moving the operation body 52 in the axial direction of the shaft portion 52c, that is, in a direction indicated by an arrow D, the operation body 52 moves the shaft portion 52c together with the Oldham's coupling 78 and the shaft 77 in the same direction with the outer peripheral wall 53a and the supporting portion 53c of the driving member 53 as a guide.

Then, the shaft 77 moves in the same direction with the hole 58a in the rotary member 58 as a guide, and the shaft portion 52c of the operation body 52 depresses the dome-shaped movable body 67 of the push switch P3. The movable body 67 is reversed to bring the cut and raised part 66a of the movable contact 66 into contact with the fixed contact 64, and the lead-through terminal 65 is electrically connected to the fixed contact 64 to switch the contact. This switching of the contact is adapted to be induced by the fixed contact 64 and the lead-through terminal 65 which have been projectedly provided outwardly from the insulating substrate 75.

Next, on removing the depressing force of the operation body 52 in a direction indicated by an arrow D, the movable body 67 is reversed by the force of the spring to return to the original state, and the cut and raised part 66a is also returned to the original state by the force of the spring, that is, a state in which the contact with the fixed contact 64 has been broken to switch the contact.

The reversing operation of the movable body 67 causes the movable body 67 to depress back the shaft portion 52c, the shaft 77 and the Oldham's coupling 78 to the original state, and the operation body 52 is located in a neutral position interposed between the movable bodies 67 of the push switches P2 and P3.

The rotatively-operated electric component according to the present invention is operated by such operations as described above, and is capable of being applied to various functions.

Figure 13:
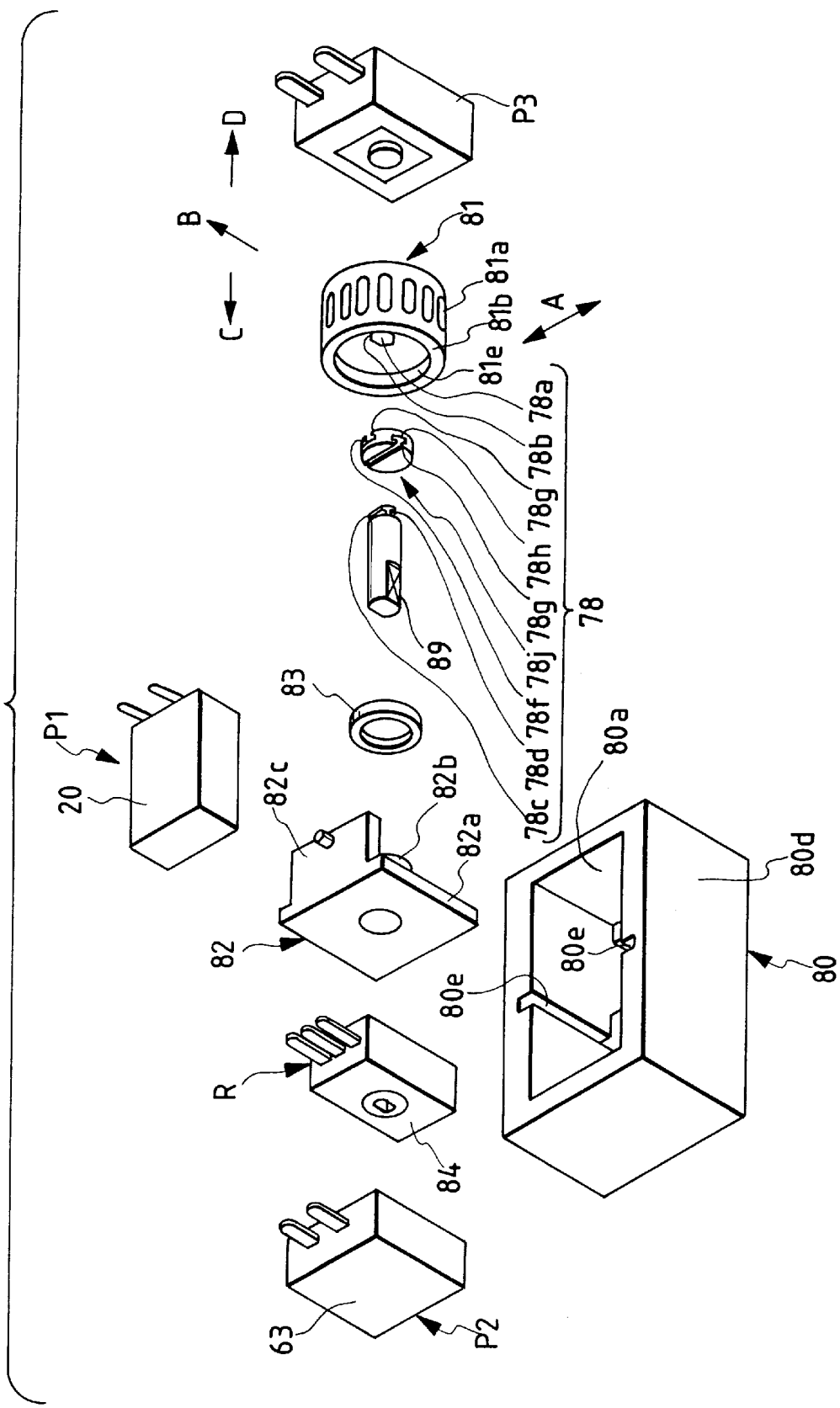
FIG. 13 is an exploded perspective view of principal parts, as viewed from the rear surface, showing a rotatively-operated electric component according to a third embodiment of the present invention.

FIGS. 13 and 14 show a third embodiment of a rotatively-operated electric component according to the present invention, and FIG. 13 is an exploded perspective view of principal parts as viewed from the rear surface, and FIG. 14 is a sectional view showing the principal parts.

The structure of the third embodiment will be described with reference to FIGS. 13 and 14. A case 80 consisting of a molded part of synthetic resin is a box-shaped one whose interior is a hollow portion 80a, and a hole 80c is provided on the upper wall 80b. On a pair of side walls 80d facing to each other, there is provided a groove portion 80e located within the hollow portion 80a.

An operation body 81 consisting of a molded part of synthetic resin comprises a ring-shaped knob portion 81b having a knurled portion 81a on its outer periphery, a shaft portion 81c located at the center of rotation of the knob portion 81b, a disk-shaped connecting portion 81d for connecting this shaft portion 81c to the knob portion 81b, and hollow portions 81e and 81f which are located on both sides of the connecting portion 81d within the knob portion 81b. This operation body 81 is inserted into the hollow portion 80a in the case 80 in such a manner that the knob portion 81b projects outwardly from the hole 80c.

A driving member 82 consisting of a molded part of synthetic resin comprises a flat plate-shaped, rectangular plate portion 82a, a cylindrical barrel portion 82b provided at the central part of the plate portion 82a, and a projection 82c provided at one end of the plate portion 82a.

This driving member 82 is disposed in such a manner that the barrel portion 82b is located within the hollow portion 81e in the operation body 81 and a projection 82c is located outside the knob portion 81b. The plate portion 82a is fitted into a pair of groove portions 80e in the case 80 to constitute a guide portion, and is mounted so as to be movable vertically with the groove portion 80e as a guide.

A ring-shaped spacer 83 made of synthetic resin is located within the hollow portion 81e in the operation body 81, and is disposed between the inner peripheral surface of the knob portion 81b and the outer peripheral surface of the barrel portion 82b of the driving member 82. The spacer 83 serves to hold the operation body 81 on the driving member 82 so that the operation body 81 can rotate on the shaft portion 81c.

The rotatively-operated electric component has an electric component member R consisting of a rotary switch, a rotary encoder and the like, and in this embodiment, a unitized rotary encoder is used. In this unitized electric component member R, a plurality of resilient fixed contacts 85 are embedded in an insulating case 84 made of synthetic resin.

There is provided a cover 86 having a hole 86a at the central part thereof so as to cover the open portion in the insulating case 84, and between this cover 86 and the insulating case 84, a rotary member 87 having a non-circular hole 87a, to which a movable contact 91 movable into and out of touch with the fixed contact 85 is mounted, is rotatably provided. Thus, a spring 90 is caused to abut on an uneven portion 87b provided on the outer periphery of the rotary member 87 to constitute a moderating mechanism.

The rotatively-operated electric component has two push switches P2 and P3, unitized having the same structure.

Since these push switches P2 and P3 have the same structure as the push switches P2 and P3 shown in the above-described embodiment, the like numerals are attached to the like parts, the explanation of which is omitted.

The push switch P2 is inserted into the hollow portion 80a in the case 80 so that it is superposed on the electric component member R for being mounted, and the opening 68a in the cover 68 for the push switch P2 is opposed to the hole 58a in the rotary member 58 of the electric component member R. The push switch P3 is inserted into the hollow portion 80a in the case 80 for being mounted so that the opening 68a in the cover 68 is opposed to the shaft portion 81c of the operation body 81.

The rotatively-operated electric component has further a first push switch P1, unitized. Since this push switch P1 has the same structure as the push switch P1 shown in the above-described embodiment, the like numerals are attached to the like parts here, the explanation of which is omitted.

An insulating substrate 88 consisting of a printed circuit board and the like comprises a plurality of holes (not shown) for inserting protrusions (not shown) provided on the lower surface of the case 80, and a plurality of holes 88b for inserting through terminals of the electric component member R and the push switches P1, P2 and P3. The first push switch P1 is mounted to this insulating substrate 88, and this insulating substrate 88 is mounted to the lower part of the case 80 by inserting the projections of the case 80 into the holes in the insulating substrate 88 so as to cover the open portion in the lower part of the case 80.

When the insulating substrate 88 is mounted, the terminals of the electric component member R, and push switches P1, P2 and P3 are inserted through the holes 88b and project outwardly, and the movable piece 74b of the movable body 74 of the first push switch P1 is opposed to the projection 82c of the driving member 82.

Further, between a non-circular shaft 89 made of metal or the like, capable of rotation and movement in the axial direction, and the operation body 81, there is provided an Oldham's coupling 78, and this Oldham's coupling 78 enables the operation body 81 to rotate, to move in the lateral axial direction and to move in a direction perpendicular to the axial direction.

Since this Oldham's coupling 78 has the same structure as the Oldham's coupling shown in the above-described embodiment, the like numerals are attached to the like parts, the explanation of which is omitted.

In such an Oldham's coupling 78, when the operation body 81 is rotated, the convex portion 78b rotates to thereby rotate the transmission unit 78j by the concave ridge portion 78f in which the convex portion 78b fits. Further the rotation of the transmission unit 78j is transmitted to the convex portion 78d which fits in the concave ridge portion 78h to rotate the shaft 89, and further to thereby rotate the rotary member 87 of the electric component member R, thus switching the electric component member R.

Also, on moving the operation body 81 in a direction perpendicular to the axial direction of the shaft portion 81c, the sliding operation is performed between the convex portion 78b and the concave ridge portion 78f, and between the convex portion 78d and the concave ridge portion 78h so that the operation body 81 can be moved in the perpendicular direction without rotating the shaft 89.

On moving the operation body 81 in the axial direction of the shaft portion 81c, the convex portions 78b and 78d and the transmission unit 78j can move the operation body 81 together with the transmission unit 78j and the shaft 89 without coming off between them by restraint of the respective restraining portions 78a, 78c, 78e and 78g.

When the shaft 89 is installed to the rotary member 87 of the electric component member R and the Oldham's coupling 78 is installed, as shown in FIG. 14, one end of the shaft 89 is opposed to the opening 68a in the cover 68 for the push switch P2 and the movable body 67, and the shaft portion 81c is opposed to the opening 68a in the cover 68 for the push switch P3 and the movable body 67.

In the operation body 81 and the shaft 89 which have been combined by the Oldham's coupling 78, one end of the shaft 89 abuts on the movable body 67 of the push switch P2, and one end of the shaft portion 81c abuts on the movable body 67 of the push switch P3 in such a manner that the operation body 81 is maintained at the neutral position in a state of being interposed between both movable bodies 67.

The description will be made of an assembly method for this rotatively-operated electric component. First, the concave ridge portion 78f of the transmission unit 78j is caused to fit into the convex portion 78b of the operation body 81 from a direction perpendicular to the axial direction. Next, the convex portion 78d of the shaft 89 is caused to fit into the concave ridge portion 78h in the transmission unit 78j likewise from the perpendicular direction.

A spacer 83 is caused to fit into a barrel portion 82b of the driving member 82, and this driving member 82 and the spacer 83 are caused to abut on the inner peripheral surface of the knob portion 81b of the operation body 81 to install the spacer 83 and the driving member 82 to the operation body 81.

In such a state, even if the Oldham's coupling 78 moves in the perpendicular direction, the transmission unit 78j abuts on the inner surface of the barrel portion 82b of the driving member 82 before the respective engagement between the projections 78b, 78d and the concave ridge portions 78f, 78h is disengaged, not to take the Oldham's coupling 78 apart.

The hole 87a in the rotary member 87 of the electric component member R is caused to fit into the shaft 89. In this state, the operation body 81, the driving member 82 and the electric component member R are inserted into the hollow portion 80a in the case 80 for being mounted, and a part of the operation body 81 is caused to project outwardly from the hole 80c.

The push switches P2 and P3 are inserted into the hollow portion 80a in the case 80 for being mounted respectively.

Next, the first push switch P1 is mounted to the insulating substrate 88, and this insulating substrate 88 is located below the case 80, and is raised upwardly so as to cause it to abut on the lower part of the case 80.

Then, the movable piece 74b of the movable body 74 of the first push switch P1 abuts on the projection 82c of the driving member 82, and the protrusions (not shown) of the case 80 are inserted through the holes (not shown) in the insulating substrate 88, and further the terminals of the electric component member R, the push switches P1, P2 and P3 enter a state in which they are inserted through the holes 88b in the insulating substrate 88.

Thus, as in the above-described embodiment, the tip ends of the protrusions projected from the holes in the insulating substrate 88 are deformed (not shown) so as to be widened by, for example, a trowel heated to complete the assembly of the rotatively-operated electric component.

The operation of a rotatively-operated electric component, having such structure, according to the present invention will be described. First, on moving the operation body 81 in a direction indicated by an arrow A in FIGS. 13 and 14 for rotation, the operation body 81 rotates on the shaft portion 81c with the spacer 83 and the barrel portion 82b of the driving member 82 as a guide.

Then, by means of the Oldham's coupling 78, the rotary member 87 of the electric component member R rotates through the shaft 89.

The rotary member 87 rotates with a feeling of the click by the moderating mechanism using a spring 90, and the movable contact 91 slides on the fixed contact 85 to switch the contact. This switching of contact is adapted to be induced by the terminal of the fixed contact 85 projectedly provided outwardly from the insulating substrate 88.

On depressing and moving the operation body 81 in a direction perpendicular to the axial direction of the shaft portion 81c, that is, in a direction indicated by an arrow B, the operation body 81 moves together with the spacer 83 and the driving member 82 with a groove portion 80e, in which the driving member 82 fits, as a guide.

Then, the projection 82c of the driving member 82 depresses the movable piece 74b, which is a part of the movable body 74 of the first push switch P1. The movement of this movable piece 74b depresses a dome-shaped movable contact 73, which is reversed to come into contact with the fixed contact 71, and the fixed contact 71 is electrically connected to the lead-through terminal 72 to switch the contact. This switching of the contact is adapted to be induced by the fixed contact 71 and the lead-through terminal 72 which have been projectedly provided outwardly from the insulating substrate 75.

During the movement of the operation body 81 in the perpendicular direction, the sliding operation is performed in the Oldham's coupling 78, that is, between the projection 78b and the concave ridge portion 78f, and between the projection 78d and the concave ridge portion 78h to thereby enable the axis G1 of the shaft portion 81c to deviate from the axis G2 of the shaft 89. During the movement in the perpendicular direction, the Oldham's coupling 78 prevents the shaft portion 81c and the shaft 89 from rotating.

Then, on removing the depressing force of the operation body 81 in the perpendicular direction, the movable contact 74 is reversed by the strength of the spring to return to its original state, and the contact with the fixed contact 71 is broken to switch the contact.

The reversing operation of the movable contact 73 causes the movable contact 73 to depress back the movable body 74, the driving member 82, the spacer 83 and the operation body 81 upwardly.

Then, the axis G1 coincides with the axis G2, and during this period of time, the Oldham's coupling 78 prevents the shaft portion 81c and the shaft 89 from rotating by the same operation as described above.

On depressing and moving the operation body 81 in the axial direction of the shaft portion 81c, that is, in a direction indicated by an arrow C, the operation body 81 moves with the outer peripheral surface of the barrel portion 82b of the driving member 82 as a guide through the spacer 83, and depresses the shaft 89 through the Oldham's coupling 78.

Then, the shaft 89 moves in the same direction with the hole 87a in the rotary member 87 as a guide, and this shaft 89 depresses the dome-shaped movable body 67 of the push switch P2. The movable body 67 is reversed to bring the cut and raised part 66a of the movable contact 66 into contact with the fixed contact 64, so that the lead-through terminal 65 is electrically connected to the fixed contact 64 to switch the contact. This switching of the contact is adapted to be induced by the fixed contact 64 and the lead-through terminal 65 which have been projectedly provided outwardly from the insulating substrate 88.

Next, on removing the depressing force of the operation body 81 in a direction indicated by an arrow C, the movable body 67 is reversed by the strength of the spring to return to the original state, and the cut and raised part 66a is also returned, by the strength of the spring, to the original state, that is, a state in which the contact with the fixed contact 64 has been broken to switch the contact.

The reversing operation of the movable body 67 causes the movable body 67 to depress back the shaft 89, the Oldham's coupling 78 and the operation body 81 to the original state, and the operation body 81 is located in a neutral position interposed between the movable bodies 67 of the push switches P2 and P3.

On depressing and moving the operation body 81 in the axial direction of the shaft portion 81c, that is, in a direction indicated by an arrow D, the operation body 81moves the shaft portion 81c in the same direction together with the Oldham's coupling 78 and the shaft 89 with the barrel portion 82b of the driving member 82 as a guide through the spacer 83.

Then, the shaft 89 moves in the same direction with the hole 87a in the rotary member 87 as a guide, and the shaft portion 81c of the operation body 81 depresses the dome-shaped movable body 67 of the push switch P3. The movable body 67 is reversed to bring the cut and raised part 66a of the movable contact 66 into contact with the fixed contact 64, so that the lead-through terminal 65 is electrically connected to the fixed contact 64 to switch the contact. This switching of the contact is adapted to be induced by the fixed contact 64 and the lead-through terminal 65 which have been projectedly provided outwardly from the insulating substrate 75.

Next, on removing the depressing force of the operation body 81 in a direction indicated by an arrow D, the movable body 67 is reversed by the strength of the spring to return to the original state, and the cut and raised part 66a is also returned, by the strength of the spring, to the original state, that is, a state in which the contact with the fixed contact 64 has been broken to switch the contact.

The reversing operation of the movable body 67 causes the movable body 67 to depress back the shaft portion 81c, the shaft 89, and the Oldham's coupling 78 to the original state, and the operation body 81 is located in a neutral position interposed between the movable bodies 67 of the push switches P2 and P3.

The rotatively-operated electric component according to the present invention is operated by such operations as described above. In this respect, it goes without saying that various push switches other than shown here are applicable.

A rotatively-operated electric component according to the present invention is provided with an Oldham's coupling between the operation body and the rotary member for operating the electric component member, and therefore, the whole of the electric component member is not moved when the operation body is moved in the perpendicular direction and the first push switch is operated. Therefore, it has a good space factor, and the device becomes small-sized.

Since the whole of the electric component member does not move, there is no need for such sliding contact and fixed contact during movement as have conventionally been used, and it is possible to extend the life and to provide a low-priced device.

Also, since the operation body is disposed with the axis of rotation thereof deviated from the axis of rotation of the rotary member, it is possible to provide a rotatively-operated electric component, flexible in the operating position, having good degree of freedom in arrangement, and capable of freely changing the position of the operation body, which is an operating member.

Also, since the switch is adapted to be operated when the operation body is operated in a direction perpendicular to the axis of rotation, it is possible to provide a low-priced rotatively-operated electric component having a long service life, in which the rotary electric component member does not move, but becomes small-sized, and there is no need for the conventional sliding contact arm mechanism.

Also, since the switch is adapted to be operated through the driving member by operation of the operation body, it is possible to provide a rotatively-operated electric component flexible, capable of freely changing disposition of the switch.

Also, by disposition of the operation body on the side of one surface of the rotary member and the driving member on the side of the other surface, it is possible to provide a rotatively-operated electric component which is small-sized in the direction of height, and is compact.

Also, since the switch is adapted to be operated when the driving member is rotated with the shaft portion as a supporting point, it is possible to provide a low-priced rotatively-operated electric component, having good assembly characteristics, to which the driving member can be easily mounted.

Also, by the disposition of the operation body and the bearing member on the side of one surface of the rotary member and the driving member and the switch on the side of the other surface, it is possible to provide a rotatively-operated electric component which is small-sized in the direction of height, and is compact.

Also, since the driving member and the switch are mounted on the mounting member, it is possible to provide a low-priced rotatively-operated electric component having a small number of component parts and good assembly characteristics.

Also, by the use of a rotatively-operated electric component according to the present invention, it is possible to provide a low-priced, small-sized coordinate input device in which the operation body can be flexibly positioned, and which has good degree of freedom in the arrangement, according to the present invention.

Further, the operation knob mounted to the operation body is caused to project outwardly from the opening in the case, whereby it is possible to provide a low-priced coordinate input device, which is thin in the direction of height, having a small-sized operation knob.

Also, since there is provided a second push switch which is adapted to be operated by the operation body, a multi-functional rotatively-operated electric component can be provided.

Also, since the operation body and the driving member are combined and the first push switch is operated by the driving member, the operation of the operation body can be transmitted to the driving member, which is another member, and to this end, it is possible to provide a flexible device which can have a degree of freedom in the disposition and the like of the push switch.

Also, by the provision of a guide portion for guiding the movement of the driving member, the driving member can be reliably moved.

Also, since the OldhamIs coupling is constituted by a convex portion having a restraining portion and a concave ridge portion having a restraining portion, reliable operation can be obtained without the Oldham's coupling coming off during movement in the axial direction.

What is claimed is:

1. A rotatively-operated electric component, comprising:
    an operation body movable in a direction perpendicular to an axial direction and rotatable;
    an electric component member for outputting an electric signal by rotating operation;
    a first push switch; and
    an Oldham's coupling provided between said operation body and a rotary member for operating said electric component member,
    said rotary member being rotated through said Oldham's coupling by rotation of said operation body to operate said electric component member, and
    said first push switch being adapted to be operated when said operation body moves in a direction perpendicular to the axial direction of said rotary member through said Oldham's coupling.

2. A rotatively-operated electric component according to claim 1, wherein there is provided a second push switch and said operation body is made movable in the axial direction, and said second push switch is operated by the movement of said operation body in the axial direction.

3. A rotatively-operated electric component according to claim 1, wherein there is provided a driving member for operating said first push switch, and said first push switch is operated through said driving member when said operation body moves in a direction perpendicular to the axial direction of said rotary member.

4. A rotatively-operated electric component according to claim 3, wherein there is provided a guide portion for guiding said driving member when said driving member moves in the direction perpendicular to the axial direction of said operation body.

5. A rotatively-operated electric component according to claim 1, wherein said Oldham's coupling comprises:
    a convex portion having a restraining portion, and
    a concave portion having a restraining portions,
    wherein the restraining portions are engaged with each other to prevent the Oldham's coupling from being pulled apart axially.

6. A rotatively-operated electric component, comprising:
    a rotary member supported to be rotatable:
    an electric component member for outputting an electric signal by rotating operation of said rotary member;
    an operation body rotatable mounted to a bearing member; and
    an Oldham's coupling disposed between said operation body and said rotary member,
    wherein:
        said operation body is disposed with the axis of rotation of said operation body deviated from the axis of rotation of said rotary member,
        said rotary member is rotated through said Oldham's coupling by rotating operation of said operation body,
        a first push switch is provided, and
        said operation body is operated in a direction perpendicular to the axis of rotation of said operation body to thereby operate said first push switch.

7. A rotatively-operated electric component according to claim 6, wherein there is provided a driving member for operating said first push switch, and by the operation of said operation body in the direction perpendicular to the axis of rotation thereof, said first push switch is operated through said driving member.

8. A rotatively-operated electric component according to claim 7, wherein said operation body is disposed on one surface side of said rotary member, and said driving member is disposed on an other surface side of said rotary member.

9. A rotatively-operated electric component according to claim 7, wherein said driving member is rotatably supported, said driving member is provided integrally with said bearing member, and by the operation of said operation body in the direction perpendicular to the axis of rotation thereof, said first push switch is operated through said driving member.

10. A rotatively-operated electric component according to claim 9 further comprising a shaft member disposed at the driving member, wherein said operation body and said bearing member to which said operation body is mounted and which is supported to be rotatable are disposed on one surface side of said rotary member, said driving member and said first push switch are disposed on an other surface side of said rotary member, an arm portion of said driving member engages with said bearing member, and by the operation of said operation body in the direction perpendicular to the axis of rotation thereof, said bearing member rotates with the shaft portion as a supporting point to thereby rotate said driving member.

11. A rotatively-operated electric component according to claim 7, further comprising a mounting member, wherein said driving member and said first push switch are mounted to said mounting member.

12. A coordinate input device, comprising:

a case, the case having an opening formed therethrough;

a rotary member within the case, the rotary member supported to be rotatable;

an electric component member within the case, the electric component member for outputting an electric signal by rotating operation of said rotary member;

an operation body within the case, the operation body rotatably mounted to a bearing member;

an operation knob, the operation knob mounted to the operation body, the operation knob projecting through the opening in the case, and an Oldham's coupling disposed between said operation body and said rotary member within the case, wherein:

said operation body is disposed with the axis of rotation of said operation body deviated from the axis of rotation of said rotary member;

said rotary member is rotated through said Oldham's coupling by rotating operation of said operation body; and the axis of rotation of the operation body is displaced toward the opening of the case with respect to the axis of rotation of the rotary member.

* * * * *